United States Patent
Ono et al.

(10) Patent No.: US 6,545,430 B2
(45) Date of Patent: Apr. 8, 2003

(54) HIGH-PRESSURE DISCHARGE LAMP, AND MANUFACTURING METHOD, LIGHTING METHOD, AND LIGHTING DEVICE FOR THE SAME

(75) Inventors: Shunsuke Ono, Takatsuki (JP); Yoshiki Kitahara, Takatsuki (JP); Haruo Nagai, Nishikyou-fu (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/844,321

(22) Filed: Apr. 27, 2001

(65) Prior Publication Data

US 2001/0038267 A1 Nov. 8, 2001

(30) Foreign Application Priority Data

Apr. 28, 2000 (JP) .......................... 2000-131425

(51) Int. Cl.⁷ .............................. G05F 1/00; H05B 37/02
(52) U.S. Cl. ...................... 315/291; 315/224; 315/307
(58) Field of Search ................. 315/246, 291, 315/106, 224, 307; 313/617, 621, 631, 634, 632, 637

(56) References Cited

U.S. PATENT DOCUMENTS

| 4,772,822 A | * | 9/1988 | van den Nieuwenhuizen et al. ................. 313/621 |
| 5,357,167 A | | 10/1994 | Mathews et al. ............ 313/632 |
| 5,436,533 A | * | 7/1995 | Fromm et al. ............... 315/246 |
| 5,463,287 A | * | 10/1995 | Kurihara et al. ............. 315/308 |
| 6,211,616 B1 | | 4/2001 | Takeuti et al. ............... 313/637 |
| 6,215,252 B1 | * | 4/2001 | Stanton ....................... 315/224 |
| 6,225,754 B1 | * | 5/2001 | Horiuchi et al. ............. 315/246 |
| 6,271,628 B1 | | 8/2001 | Sugitani et al. ............. 313/637 |

FOREIGN PATENT DOCUMENTS

| DE | 19812298 | 10/1998 | ............ H01J/61/73 |
| EP | 901151 | 3/1999 | ............ H01J/61/82 |
| JP | 6013029 | 1/1994 | |
| JP | 06013029 A | 1/1994 | ............ H01J/61/73 |
| JP | 09069353 A | 3/1997 | ............ H01J/61/73 |
| JP | 09165641 A | 6/1997 | ............ H01J/61/73 |
| JP | 1092377 | 4/1998 | ............ H01J/61/73 |
| JP | 10092377 A | 4/1998 | ............ H01J/61/73 |
| JP | 2820864 | 8/1998 | ............ H01J/61/73 |
| JP | 11-149899 | 6/1999 | ............ H01J/61/20 |
| JP | 11-297268 | 10/1999 | ............ H01J/61/20 |

* cited by examiner

Primary Examiner—Hoang Nguyen

(57) ABSTRACT

A high pressure discharge lamp having a pair of electrodes with a space of 0.5 mm to 2.0 mm inclusive between them and disposed in an arc tube. An electrical discharge takes place between the electrodes. Each of the electrodes has an electrode rod and a head that is provided at the discharge side end of the electrode rod and having a larger diameter than the electrode rod. A surface of the head being opposite to the other electrode is convexly curved and a protruding part is formed in the vicinity of the center portion of the end of the head.

21 Claims, 14 Drawing Sheets

PRIOR ART

FIG.6

GENERATION STATE OF ARC JUMPING PHENOMENON
IN ELECTRODES FOR LONG ARC LAMPS

| LIGHTING TIME (hrs) | SQUARE WAVE FREQUENCY (Hz) | | | | | | |
|---|---|---|---|---|---|---|---|
| | 50 | 150 | 300 | 500 | 700 | 750 | 1000 |
| 1 | ooooo | ooooo | ooooo | ooooo | ooooo | ooooo | ooooo |
| 50 | ooooo | ooooo | ooooo | ooooo | ooooo | ooooxo | oooox |
| 100 | ooooo | ooooo | ooooo | ooooo | ooooo | ooxxo | ooxxx |
| 200 | oooxo | oxooxo | ooxxo | oooox | xooooo | oxxxo | ooxxx |
| 300 | oxxxo | oxoxx | ooxxx | xooxx | xoxoo | oxxxo | oxxxx |
| 500 | xxxxxx | xxxxxx | xxxxxx | xxxxxx | xxxxxx | xxxxxx | xxxxxx |
| 1000 | — | — | — | — | — | — | — |
| 2000 | — | — | — | — | — | — | — |
| 3000 | — | — | — | — | — | — | — | o : INDICATES ARC JUMPING PHENOMENON HAS NOT OCCURRED
x : INDICATES ARC JUMPING PHENOMENON HAS OCCURRED
— : INDICATES LIHGTING HAS BEEN STOPPED

FIG.9 GENERATION STATE OF ARC JUMPING PHENOMENON
IN IMPROVED ELECTRODES FOR SHORT ARC LAMPS

| LIGHTING TIME (hrs) | SQUARE WAVE FREQUENCY (Hz) | | | | | | | | |
|---|---|---|---|---|---|---|---|---|---|
| | 50 | 150 | 300 | 500 | 700 | 750 | 1000 |
| 1 | ooooo | ooooo | ooooo | ooooo | ooooo | ooooo | ooooo |
| 50 | ooooo | ooooo | ooooo | ooooo | ooooo | ooooo | ooooo |
| 100 | ooooo | ooooo | ooooo | ooooo | ooooo | oooox | oooox |
| 200 | ooooo | ooooo | ooooo | ooooo | ooooo | ooxox | oxoox |
| 300 | ooooo | ooooo | ooooo | ooooo | ooooo | oxxox | oxxxx |
| 500 | ooooo | ooooo | ooooo | ooooo | ooooo | xxxxx | xxxxx |
| 1000 | ooooo | ooooo | ooooo | ooooo | ooooo | – | – |
| 2000 | ooooo | ooooo | ooooo | ooooo | ooooo | – | – |
| 3000 | ooooo | oooxo | ooooo | ooooo | ooxoo | – | – |

( o : INDICATES ARC JUMPING PHENOMENON HAS NOT OCCURRED
x : INDICATES ARC JUMPING PHENOMENON HAS OCCURRED
– : INDICATES LIHGTING HAS BEEN STOPPED )

FIG.11

LAMP VOLTAGE VARIATION (DECREASE) RESULTING FROM THE FORMATION OF PROTRUDENT PARTS AT THE ELECTRODE TIPS△

| SQUARE WAVE FREQUENCY (Hz) | LAMP No. | INITIAL LAMP VOLTAGE (V) | LAMP VOLTAGE(V) AFTER 10 hrs | VARIATION IN LAMP VOLTAGE △V1a(V) | STATE OF ELECTRODE |
|---|---|---|---|---|---|
| 150 | 1 | 62.8 | 57.1 | −5.7 | PROTRUSION FORMED |
|  | 2 | 60.9 | 53.5 | −7.4 | PROTRUSION FORMED |
|  | 3 | 62.2 | 56.9 | −5.3 | PROTRUSION FORMED |
|  | 4 | 59.3 | 53.2 | −6.1 | PROTRUSION FORMED |
|  | 5 | 64.9 | 57.8 | −7.1 | PROTRUSION FORMED |
|  | AVG. | 62.0 | 55.7 | −6.3 |  |
| 400 | 6 | 61.5 | 54.2 | −7.3 | PROTRUSION FORMED |
|  | 7 | 63.0 | 57.0 | −6.0 | PROTRUSION FORMED |
|  | 8 | 59.2 | 54.0 | −5.2 | PROTRUSION FORMED |
|  | 9 | 62.0 | 54.3 | −7.7 | PROTRUSION FORMED |
|  | 10 | 60.5 | 56.2 | −4.3 | PROTRUSION FORMED |
|  | AVG. | 61.2 | 55.1 | −6.1 |  |
| 800 | 11 | 61.3 | 66.5 | +5.2 | NO PROTRUSION |
|  | 12 | 60.5 | 67.0 | +6.5 | NO PROTRUSION |
|  | 13 | 59.4 | 65.1 | +5.7 | NO PROTRUSION |
|  | 14 | 63.6 | 69.3 | +5.7 | NO PROTRUSION |
|  | 15 | 62.5 | 68.0 | +5.5 | NO PROTRUSION |
|  | AVG. | 61.5 | 67.2 | +5.7 |  |

FIG.12

LAMP VOLTAGE VARIATION(DECREASE) $\Delta V1a$ IN THE LAMPS WITH De (DISTANCE BETWEEN ELECTRODES) CORRECTED IN ADVANCE

| LAMP No. | INITIAL LAMP VOLTAGE (V) | LAMP VOLTAGE (V) AFTER 10 hrs | VARIATION IN LAMP VOLTAGE $\Delta V1a$(V) | STATE OF ELECTRODE |
|---|---|---|---|---|
| 1 | 66.4 | 60.0 | −6.4 | PROTRUSION FORMED |
| 2 | 67.0 | 61.5 | −5.5 | PROTRUSION FORMED |
| 3 | 68.3 | 62.4 | −5.9 | PROTRUSION FORMED |
| 4 | 69.4 | 61.7 | −7.7 | PROTRUSION FORMED |
| 5 | 65.9 | 60.3 | −5.6 | PROTRUSION FORMED |
| AVG. | 67.4 | 61.2 | −6.2 | |

(SQUARE WAVE FREQUENCY:150Hz)

FIG.13

REDUCTION IN LAMP VOLTAGE VARIATION ΔV1a RESULTING FROM INCREASE IN
THE DISCHARGE ARC CURRENT FOR CORRECTING DECREASE IN LAMP INPUT POWER

| LAMP No. | INITIAL LAMP VOLTAGE (V) | LAMP VOLTAGE(V) AFTER 10 hrs | VARIATION IN LAMP VOLTAGE ΔV1a(V) | LAMP VOLTAGE (V) AFTER 10hrs WHEN DISCHARGE ARC CURRENT INCREASED | VARIATION IN LAMP VOLTAGE ΔV1a (V) AFTER DISCHARGE ARC CURRENT INCREASED |
|---|---|---|---|---|---|
| 1 | 59.3 | 54.7 | −4.6 | 57.1 | −2.2 |
| 2 | 63.2 | 55.9 | −7.3 | 56.5 | −6.7 |
| 3 | 60.1 | 53.9 | −6.2 | 57.8 | −2.3 |
| 4 | 61.5 | 55.7 | −5.8 | 58.1 | −3.4 |
| 5 | 62.0 | 55.1 | −6.9 | 57.3 | −4.7 |
| AVG. | 61.2 | 55.1 | −6.1 | 57.4 | −3.8 |

(SQUARE WAVE FREQUENCY:150Hz)

FIG.15

REDUCTION IN LAMP VOLTAGE VARIATION ΔV1a RESULTING FROM SWITCHING AMONG SQUARE WAVE FREQUENCIES

| LAMP No. | INITIAL LAMP VOLTAGE (V) | LAMP VOLTAGE(V) AFTER 10 hrs AT FREQUENCY OF 150Hz | VARIATION IN LAMP VOLTAGE ΔV1a(V) | LAMP VOLTAGE(V) AFTER 10 hrs AT FREQUENCY OF 800Hz | VARIATION IN LAMP VOLTAGE ΔV1a(V) AFTER LIT UP AT FREQUENCY OF 800Hz |
|---|---|---|---|---|---|
| 1 | 63.2 | 56.7 | −6.5 | 62.8 | −0.4 |
| 2 | 59.3 | 54.3 | −5.0 | 60.1 | +0.8 |
| 3 | 60.6 | 55.1 | −5.5 | 60.2 | −0.4 |
| 4 | 61.1 | 54.9 | −6.2 | 59.8 | −1.3 |
| 5 | 62.3 | 55.3 | −7.0 | 61.0 | −1.3 |
| AVG. | 61.3 | 55.3 | −6.0 | 60.8 | −0.5 |

HIGH-PRESSURE DISCHARGE LAMP, AND MANUFACTURING METHOD, LIGHTING METHOD, AND LIGHTING DEVICE FOR THE SAME

BACKGROUND OF THE INVENTION (1) Field of the Invention

The present invention relates to a short arc high-pressure discharge lamp. The present invention also relates to a manufacturing method, a lighting method, and a lighting device for the lamp.

(2) Description of the Related Art

Recently, projection type display devices, such as a liquid crystal projector, have been actively developed. Such a projection type display device requires a high-intensity light source, which is close to a point light source. Therefore, high-pressure discharge lamps, such as a short arc extra-high pressure mercury lamp and a metal halide lamp, are generally used.

Originally, the construction of a tungsten electrode used in the short arc extra-high pressure mercury lamp and the metal halide lamp as the light source for the projection type display device was the same as that used in the conventional long arc high-pressure discharge lamp for a general purpose luminaire.

FIG. 1 shows a construction of an electrode 50 in the long arc high-pressure discharge lamp. As shown in this figure, the electrode 50 is composed of an electrode rod 51 made of tungsten and a coil 52 made up of a thin tungsten wire, with the coil 52 being set at a discharge side end of the electrode rod 51. This coil 52 has a function of dissipating heat and, as such, is set in order to prevent the electrode from overheating.

In the short arc lamp using the electrode 50, however, especially a temperature of the tip end 53 of the electrode further increases when compared to the long arc lamp, because a distance between electrodes is short. Thus, with thermal dissipation through the coil 52 only, it is impossible to keep the tungsten electrode material from melting and evaporating and to keep the tip end of the electrode from deforming and wearing. This gives rise to problems that deterioration of luminous flux from a lamp is caused and a lamp life is shortened.

Meanwhile, the recent trend for a short arc high-pressure discharge lamp for a projection type display device is to improve the luminance on the display screen. To achieve this by improving the efficiency for light utilization when combined with the reflecting mirror system, a lamp in a shorter arc type, in which the distance between electrodes is reduced from conventional 2.0–5.0 mm to 2.0 mm or less, has been developed. In this shorter arc type lamp, there is a new problem, specific to the shorter arc type lamp, that an "arc jumping phenomenon" remarkably occurs. That is, as shown in FIG. 2, the electrode spot (the point where electrons are radiated out from the electrode as a cathode), which was originally formed in the vicinity of the tip ends of the electrodes 50 and 55 is not secured at one point, but moves at random with the passage of the lighting hours.

When this arc jumping phenomenon occurs, the discharge arc deviates from the optical axis of the lamp unit in which a reflecting mirror is incorporated. This causes the luminance on the display screen irradiated by the lamp unit to significantly fluctuate. Therefore, the market demands the development of a high-quality short arc high-pressure discharge lamp by which the luminance fluctuation on the display screen owing to the arc jumping phenomenon can be securely avoided.

SUMMARY OF THE INVENTION

The first object of the present invention is to provide a high-pressure discharge lamp whose lamp life is relatively long and resists the arc jumping phenomenon.

The second object of the invention is to provide a manufacturing method for the high-pressure discharge lamp.

The third object of the invention is to provide a lighting method which allows a high-pressure discharge lamp to have a long lamp life and to resist the arc jumping phenomenon.

The fourth object of the invention is to provide a lighting device which allows a high-pressure discharge lamp to have a long lamp life and to resist the arc jumping phenomenon.

The above first object is achieved by a high pressure discharge lamp made up of: an arc tube enclosing an arc chamber that contains a light-emitting substance and is hermetically sealed; and a first electrode and a second electrode that are spaced apart from each other, and each have an electrode rod coaxially extending into the arc chamber as a main body, and at least one of the first and second electrodes having a head integrally coupled with the electrode rod, on which a protrusion part is formed, wherein the head has a larger volume per unit length in the direction of the axis of the electrode rod than the electrode rod, and the protruding part is formed at a portion opposite to the other electrode.

The above second object is achieved by a method for manufacturing a high pressure discharge lamp in which a first and a second electrodes are provided so that tip ends of the electrodes face each other in an arc tube including the steps of: a head formation step for forming a head at an end of an electrode rod of at least one of the first and the second electrodes, wherein the head has a larger volume per unit length in the direction of the axis of the electrode rod than the electrode rod; a sealing step for sealing the first and the second electrodes so that the tip ends of the electrodes face each other at a predetermined interval; and a protruding part formation step for forming a protruding part on the head at a portion opposite to the tip end of the other electrode.

The above third object is achieved by (1) a lighting method for a high pressure discharge lamp in which a pair of electrodes that each have a head at an end of an electrode rod and a protruding part formed at an end of the head are provided so that the heads of the electrodes face each other in an arc tube, wherein each head is thicker than the electrode rod, including the steps of: (a) increasing a discharge arc current applied between the electrodes, in case that a monitor voltage between the electrodes becomes less than a predetermined voltage; and (b) decreasing the discharge arc current applied between the electrodes, in case that the monitor voltage becomes the predetermined voltage or more, in which these steps are alternately repeated, and (2) a lighting method for a high pressure discharge lamp in which a pair of electrodes that each have a head at an end of an electrode rod and a protruding part formed at an end of the head are provided so that the heads of the electrodes face each other in an arc tube, wherein each head is thicker than the electrode rod, including the steps of: (a) a first step for setting a frequency of an AC current applied between the electrodes at a first frequency when a monitor voltage between the electrodes rises to a first voltage; and (b) a second step for setting a frequency of the AC current at a second frequency, when the monitor voltage drops to a second voltage, the second voltage is lower than the first voltage, in which the first and the second steps are alternately repeated.

The above fourth object is achieved by (a) a lighting device for a high pressure discharge lamp in which a pair of electrodes that each have a head at an end of an electrode rod and a protruding part formed at an end of the head are provided so that the heads of the electrodes face each other in an arc tube, wherein each head is thicker than the electrode rod, made up of: a current generation means for generating a current which is applied between the pair of electrodes; a voltage detection means for detecting a voltage developed across the pair of electrodes; and a control means for controlling the current generation means and allowing the current generation means to adjust the current between the pair of electrodes according to a detected result by the voltage detection means, and (b) a lighting device for a high pressure discharge lamp in which a pair of electrodes that each have a head at an end of an electrode rod and a protruding part formed at an end of the head are provided so that the heads of the electrodes face each other in an arc tube, wherein each head is thicker than the electrode rod, made up of: a current generation means for generating an AC current which is applied between the pair of electrodes; a voltage detection means for detecting a voltage developed across the pair of electrodes; and a control means for controlling the current generation means and allowing the current generation means to adjust a frequency of the AC current between the pair of electrodes according to a detected result by the voltage detection means.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 6 shows the result of the Experiment 1;

FIG. 9 shows the result of the Experiment 2;

FIG. 11 shows the result of an experiment in the Experiment 5 conducted so as to examine variations in the lamp voltage with reference to formation of the protruding part at the tip end of the electrode;

FIG. 12 shows the result of an experiment in the Experiment 5 conducted so as to examine variations in the lamp voltage in the lamp whose distance De between electrodes was corrected in advance;

FIG. 13 shows the result of an experiment in the Experiment 6 where adjustment of the distance between electrodes De was conducted by varying a discharge arc current;

FIG. 15 shows the result of an experiment in the Experiment 6 where adjustment of the distance between electrodes De was conducted by varying an operation frequency.

DESCRIPTION OF THE PREFERRED EMBODIMENT

Figure 1:
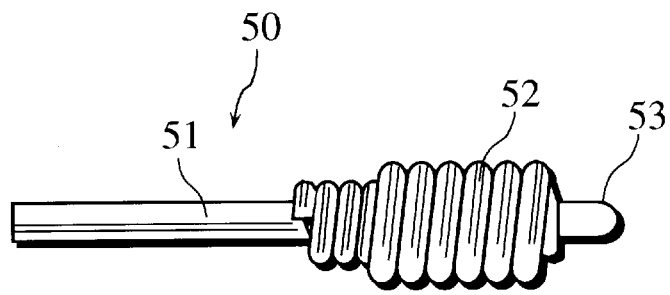
FIG. 1 shows a shape of the tip end of a conventional electrode of a short arc high-pressure discharge lamp.
Figure 2:
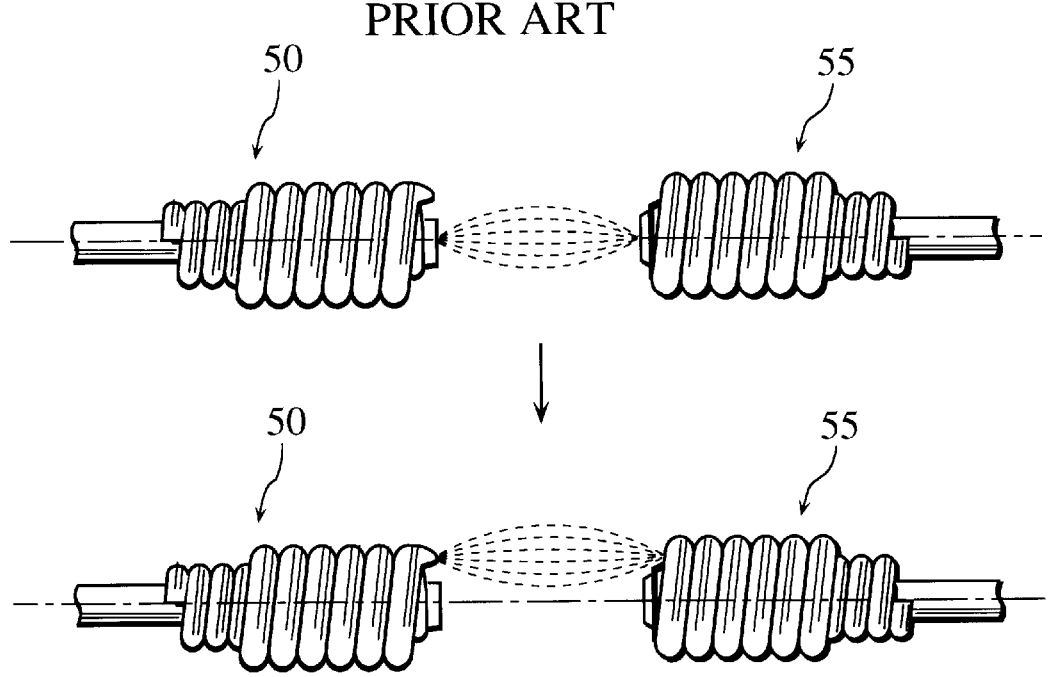
FIG. 2 shows a state where an arc jumping phenomenon occurs in the electrode of the above short arc high-pressure discharge lamp.

The following describes a preferred embodiment of the invention, referring to the drawings.

Figure 3:
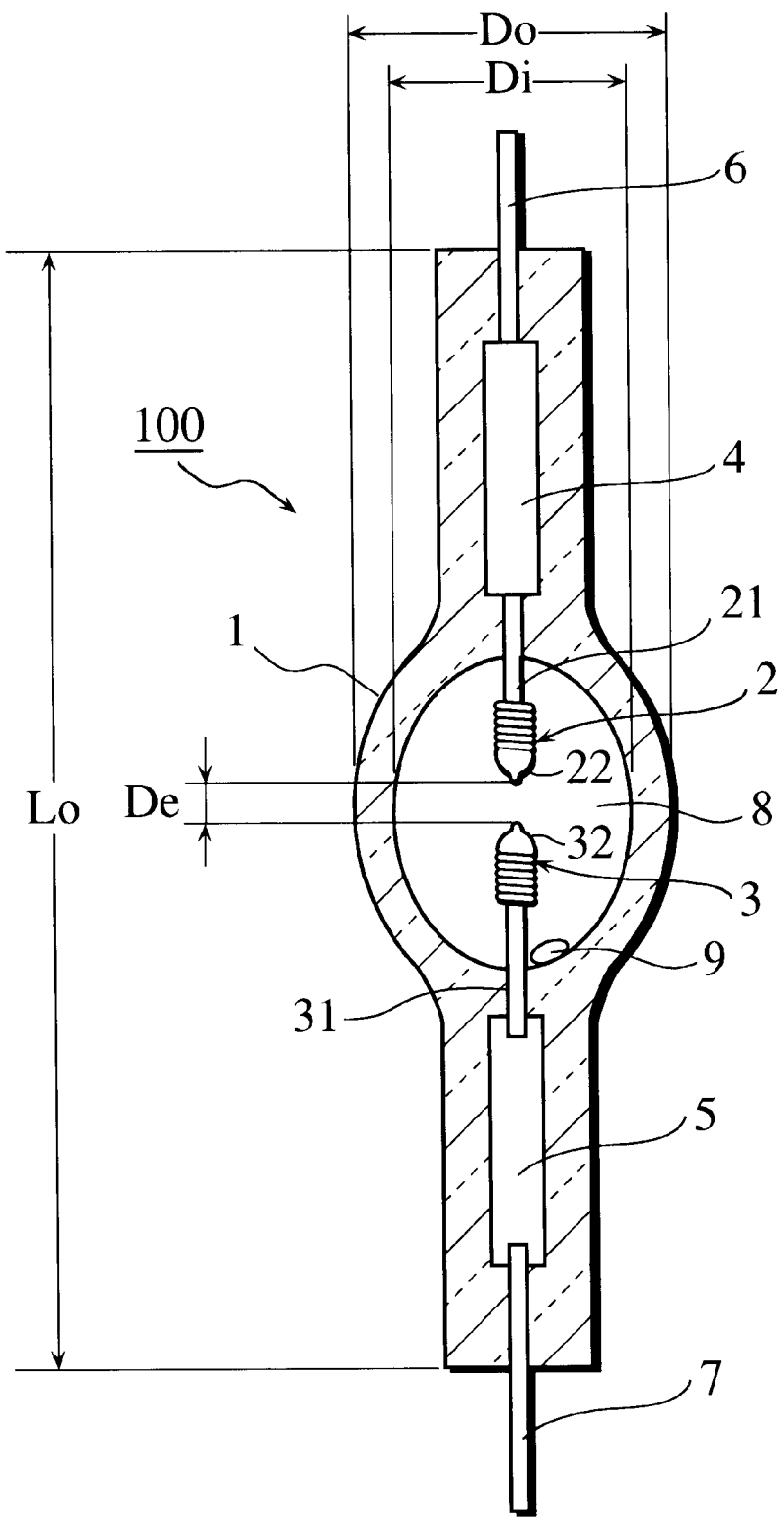
FIG. 3 is a sectional view showing a construction of an extra-high pressure mercury lamp according to the embodiment of the invention.

FIG. 3 shows a construction of an arc tube in an extra-high pressure mercury lamp 100 according to a preferred embodiment of the invention. This figure shows a vertical sectional view of the lamp to reveal the electrodes for the sake of clarity.

As shown in this figure, the extra-high pressure mercury lamp 100 is provided with an arc tube 1 that is made of quarts glass with its middle part in the direction of the length being spheroid. In the arc tube 1, a pair of tungsten electrodes 2 and 3 are hermetically sealed, with their one ends being connected to pieces of molybdenum foil 4 and 5 in the both ends of the arc tube. The outer ends of the molybdenum foil 4 and 5 are connected to outer molybdenum lead wires 6 and 7 which lead to the outside of the arc tube 1.

Conventionally, a distance between the tip ends of these tungsten electrodes 2 and 3, (i.e., a distance between electrodes De) is set at in the range of 2.0 mm to 5.0 mm. In a preferred embodiment of the invention, however, the value of De is set at in the range of 0.5 mm to 2.0 mm in order to improve the efficiency for light utilization. Note that, in this specification, the expression "n1 to n2" indicates the range from the lower limit n1 to the upper limit n2 inclusive.

An arc chamber (discharge space) 8 inside the arc tube 1 is filled with mercury 9 as a light-emitting material, inert gases such as Ar, Kr, and Xe as a starting-up gas, and a halogen material such as I and Br. The amount of the mercury 9 is in the range of 150 to 350 mg/cm$^3$ per cubic foot of capacity of the arc chamber (which corresponds to approximately 15 MPa to 35 MPa, if estimated in a pressure of mercury when the lamp is lit up in the steady state). While, the pressure of the inert gases is in the range of 0.01 MPa to 1 MPa when the lamp is cool.

Here, Br of in the range of $1 \times 10^{-10}$ to $1 \times 10^{-4}$ mol/cm$^3$ is conventionally used as the halogen material. This material performs a service called the "halogen cycle", in which, instead of collecting on the lamp wall of the quarts crystal discharge lamp, the tungsten atoms evaporating from the electrodes are returned to the electrodes, which prevents the arc tube from blackening.

In addition, bulb wall loading "We" (a value obtained by dividing the lamp input power by the internal surface area of the enclosure of the arc tube 1) is set at the relatively high range of 0.8 W/mm$^2$ or more in order to realize almost the highest lamp efficiency of the quarts crystal arc tube. That is, the lamp efficiency of the high-pressure discharge lamp basically increases with increasing the bulb wall loading We. Therefore, in order to improve the lamp efficiency, the value of We is increased to the range corresponding to the critical temperature (approximately 1,350 K) at which the quartz glass arc tube can be lit up in the steady state.

Figure 4:
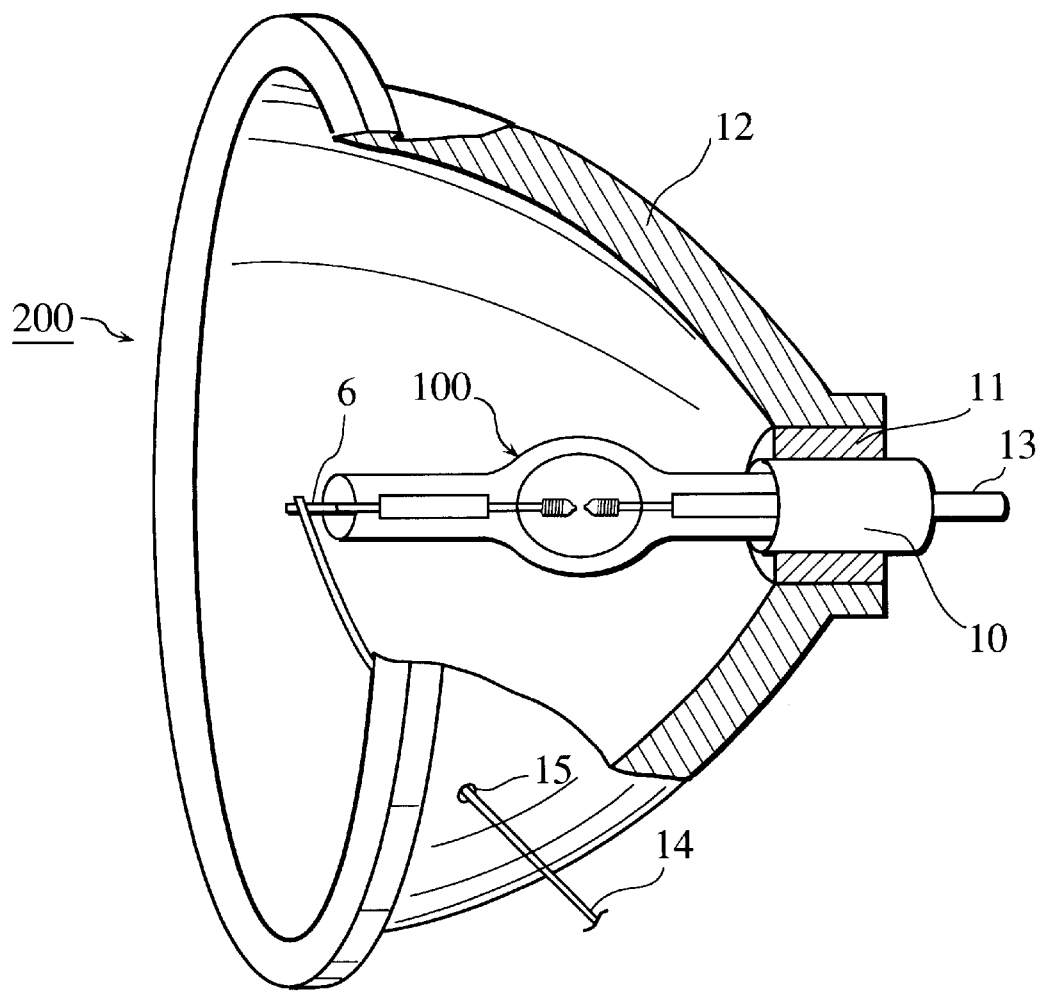
FIG. 4 is a partially cutaway view in perspective showing a configuration of a lamp unit using the above extra-high pressure mercury lamp.

FIG. 4 is a partially cutaway view in perspective showing a configuration of a lamp unit 200 in which the above extra-high pressure mercury lamp 100 is incorporated. As shown in this figure, the lamp unit 200 is configured so that one end of the arc tube 1 is connected to a base 10, and the base 10 is adjusted and attached via a spacer 11 to a reflecting mirror 12 so that the arc axis of the lamp lies in the optical axis of the reflecting mirror 12. A current is fed through the both electrodes of the extra-high pressure mercury lamp 100 by way of a lead wire 14 and a terminal 13, respectively. The lead wire 14 passes through a hole 15 drilled through the wall of the reflecting mirror 12 and is guided to outside.

Figure 5:
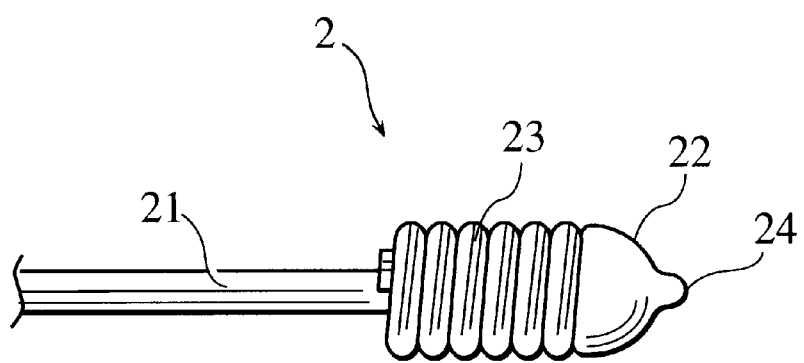
FIG. 5 shows a shape of an electrode in the above extra-high pressure mercury lamp.

FIG. 5 shows a shape of the tip end of the electrode 2. A tungsten electrode rod 21 has a hemisphere-shaped head 22 of larger diameter than that of the electrode rod 21 at its tip end, and a protruding part 24 is formed at the top of the head 22. This construction leads to increase of a lamp life and prevention of the arc jumping phenomenon. Note that, since an electrode 3 has the same shape as the electrode 2, the following description on the shape of the electrodes uses only the reference numerals assigned to the electrode 2 in FIG. 5 unless otherwise specified.

The following is the detailed description on the story behind the invention of the electrode shape shown in FIG. 5 and effects from the shape, in conjunction with results of the experiments.

First, the inventor conducted a series of examinations using a plurality of test lamps having the same basic configuration as the extra-high pressure mercury lamp 100 in FIG. 3 except the shape of the tip end of the electrode. The following experiments are required for considerations to effectively prevent the arc jumping phenomenon, which occurs with the passage of the lighting time.

The specifications for the test lamps used in the experiments are as follows: that is, the lamp input power W1$a$ is set at 150 W. As for dimensions of the arc tube 1, the maximum external diameter Do of the central part of the vessel is 9.4 mm (the maximum internal diameter Di; 4.4 mm), the distance between electrodes De is 1.1 mm, the overall capacity of the vessel is 0.06 cm$^3$, the overall length Lo of the vessel is 57 mm, and the internal surface area of the enclosure SI is 160 mm$^2$. With these dimensions of the vessel, the bulb wall loading We of the arc tube 1 is 0.9 W/mm$^2$.

The arc chamber is filled with mercury of 13.8 mg (230 mg per cubic foot of the capacity of the chamber, which corresponds to approximately 23 MPa of the mercury vapor pressure when the lamp is lit up), argon gas at 20 kPa, and Br of 10$^{-6}$mol/cm$^3$ of the composition CH$_2$Br$_2$ as the halogen material. Here, the composition of Br may be HBr or HgBr$_2$.

Using the test lamps, each of which was incorporated into the lamp unit 200, and an electronic ballast in a full bridge configuration as the lighting device which generates a square wave, the experiment for lighting the test lamps was conducted by repeated cycles of light-up (3.5 hr)/shut-off (0.5 hr) with the arc tube 1 being kept horizontal. In order to see whether the occurrence of the above-stated arc jumping phenomenon depends on the frequency of the used electronic ballast, the square wave frequency was varied in the range of 50 Hz to 1,000 Hz. After lighting up the test lamps for a predetermined time period, the test lamps were lit up for 2 hours, while being examined whether the arc jumping phenomenon had occurred or not (5 lamps were examined for each experiment).

Experiment 1

First, for a preliminary study, the inventor prepared test lamps having electrodes 50 shown in FIG. 1 for conventional long arc lamps, and examined these lamps as to whether the arc jumping phenomenon occurred or not with the passage of the lighting time.

In this experiment, the electrode was composed of a tungsten electrode rod 51 of 0.4 mm in thickness and a double-layered wound coil 52 (8 turns of coil) made up of a tungsten wire of 0.2 mm in thickness, with the coil 52 being inserted and fixed at a tip end of the electrode rod 51. The material of the electrode rod 51 and the coil 52 was high purity tungsten in which the total content of Al, Ca, Cr, Cu, Fe, Mg, Mn, Ni, Si, Sn, Na, K, Mo, U, and Th elements as accessory components was 10 ppm or less. It is known that this high purity tungsten prevents blackening of the arc tube throughout the lamp life, which leads to improvement of the luminous flux maintenance factor. FIG. 6 shows the result of this preliminary experiment.

This experiment discloses the following facts.

(1) The arc jumping phenomenon has occurred in the all test lamps having electrodes 50 for conventional long arc lamps within 500 hours of lighting time. Examining the electrodes of the test lamps after the experiment, it was observed that the tip end parts were deformed and worn.

(2) Examining the correlation between the occurrence of the arc jumping phenomenon and the operation frequency of the symmetric square wave, the lighting hours by which the arc jumping phenomenon had occurred had the tendency to be increased in the range of operation frequency of 700 Hz or less, while to be decreased in the range of operation frequency of more than 700 Hz.

From the above-stated facts, it was found that, as far as the electrodes 50 for conventional long arc lamps are used, the high-pressure discharge lamp by which the object of the invention can be achieved (that is, the short arc high-pressure discharge lamp which can securely prevent the arc jumping phenomenon) cannot be obtained. In addition, it was also found that there was a correlation between the occurrence of the arc jumping phenomenon and the operation frequency of the symmetric square wave.

Experiment 2

For the second examination, the inventor conducted an experiment using an electrode having a larger diameter part at its end, in the expectation that the arc jumping phenomenon would be prevented by suppressing the deformation and wearing of the tip of the electrode of the lamp.

Figure 7A:
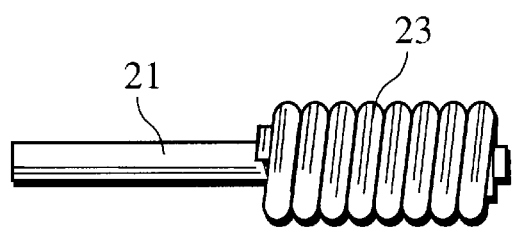
FIGS. 7A and 7B are drawings to help explain manufacturing processes for melting the tip end of the above electrode.
Figure 7B:
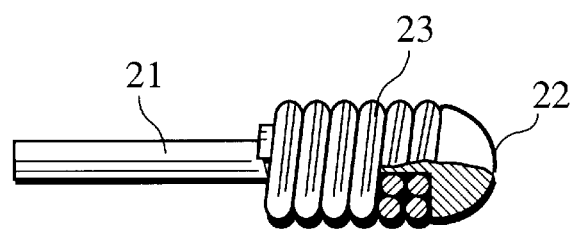

FIG. 7B is a partially cutaway sectional view showing the shape of the tip end of the electrode. A substantially hemisphere-shaped head 22 is formed at the tip end of the electrode rod 21.

This shape is obtained by attaching a tungsten wire coil 23 at the tip end of the tungsten electrode rod 21, then melting the tip end of the electrode rod 21 and a part of the coil 23. In this experiment, more specifically, the tungsten electrode rod of 0.4 mm in thickness was inserted into and fixed to the two-layered wound coil 23 (8 turns of coil) made up of a tungsten wire of 0.2 mm in thickness and the tip ends of the tungsten electrode rod 21 and of the coil 23 were melted by electrical discharge machining using an argon plasma welding apparatus.

Figure 8:
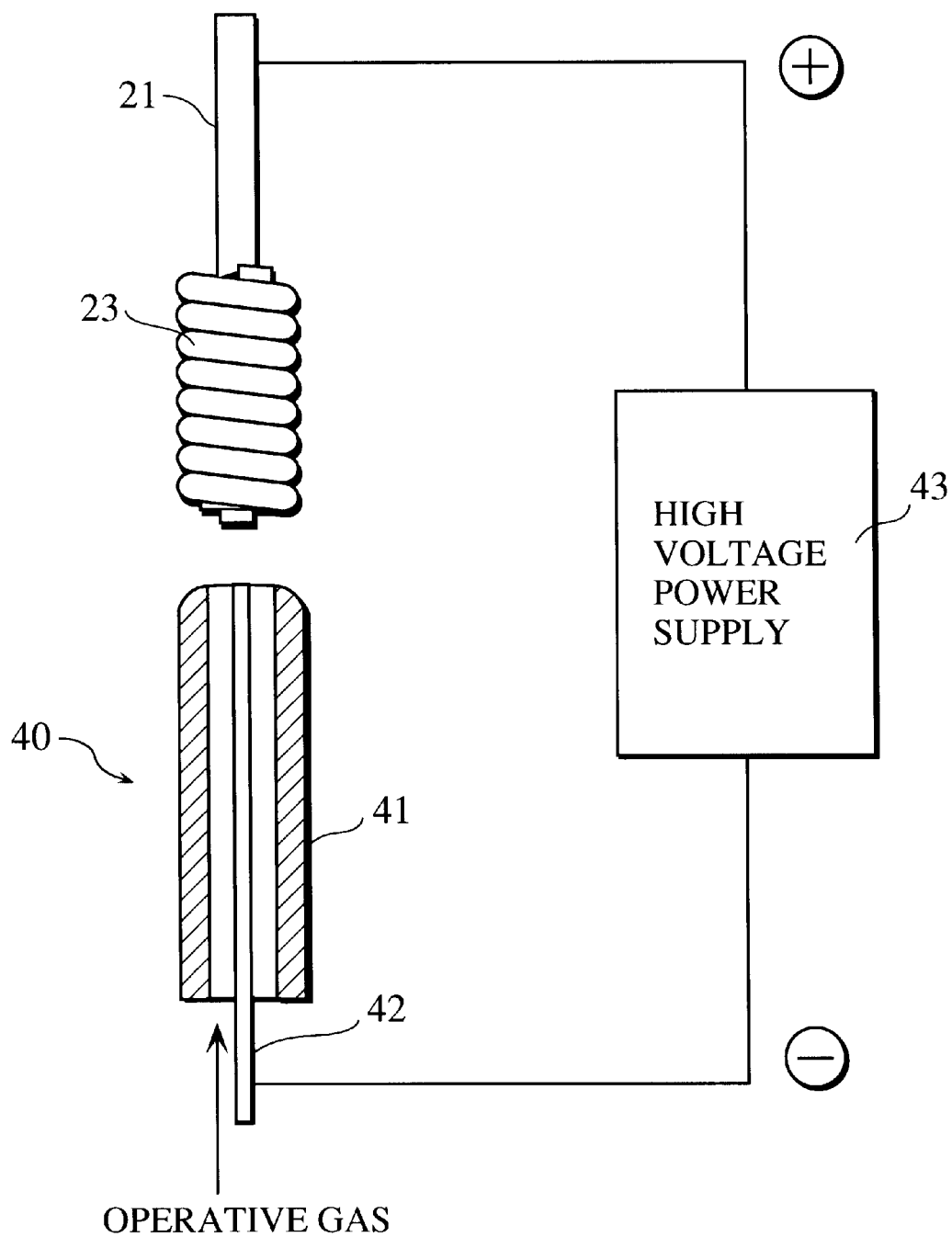
FIG. 8 shows a configuration of an argon plasma welding apparatus by which the above end of the electrode is melted.

FIG. 8 shows the configuration of the argon plasma welding apparatus. As shown in this figure, a plasma torch 40 consists of a nozzle 41 and a cathode rod 42, with the cathode rod 42 being inserted into the nozzle 41 so that it has clearance when inserted. In this apparatus, arc discharge is generated by applying a high voltage between the electrode rod 21 and the cathode rod 42, while an operative gas including argon is fed through the nozzle 41, whereby high temperature plasma is generated and a melt process is conducted to the tip end opposite to the plasma torch 40 of the electrode.

There is a tendency for the melted tip end (i.e., the melted tungsten) to contract in a sphere shape due to the surface tension. As a result, the tip end is formed in the substantially hemisphere shape. It is preferable that, in order to form the hemisphere shape (i.e., convexly curved surface) being symmetric with respect to the center of the axis of the electrode, the melt process is conducted to the electrode rod 21 and the plasma torch 40 with each major axis lying in the same vertical axis, because the shape of the tip end is influenced by the gravity. It is also preferable that, in order to form the tip end of the electrode being closer to the ideal hemisphere shape, the electrode rod is provided above the plasma torch 40, that is, so that the convexly curved surface in a hemisphere shape points downward.

Also, in this electrical discharge machining process, in order not to leave defects such as a void inside the melted head 22, the machining temperature of the head 22 was appropriately controlled by combining intermittently arc discharge machining performed a plurality of times (arc current; 32A×30 msec, 5 to 8 times) with a predetermined cooling time (1.5 to 3.0 sec).

By providing the head 22 having a larger diameter at the tip end of the electrode rod 21 as above, the heat capacity of this part is increased, whereby this part is resistant to melting deformation due to the arc discharge. In addition, since the head 22 is substantially integral with the coil 23 by the melt process, heat is immediately conducted to the coil 23, so that the temperature of the head 22 becomes hard to rise, which prevents the deformation and wearing of the tip end of the electrode due to melting and evaporation of the electrode material and leads to increase of the lamp life.

The inventor prepared the test lamps having the improved electrodes shown in FIG. 7B, and examined a correlation between the lighting time and occurrence of the arc jumping phenomenon in the same manner as the above Experiment 1. From this experiment, a result shown in FIG. 9 was obtained.

The design of the lamp and the arc tube used in this experiment is the same as in Experiment 1, except the construction of the electrode.

As shown in this FIG. 9, the experiment, where the test lamps having the electrodes with the above-stated heads subjected to the melt process were used, made a correlation between the occurrence of the arc jumping phenomenon and the operation frequency of the symmetric square wave of the electronic ballast very clear. That is, in the all test lamps which were lit up at the frequencies higher than 700 Hz, the arc jumping phenomenon has occurred within 500 hrs. This result was almost the same as in the Experiment 1 where the lamps having the electrodes for long arc lamps were examined. Meanwhile, as for the test lamps which were lit up at the frequencies in the range of 50 Hz to 700 Hz, the lighting hours by which the arc jumping phenomenon occurred was remarkable increased. Among 25 test lamps, the arc jumping phenomenon has not occurred in 23 lamps until 3,000 hours. When compared to Experiment 1, the lamp lives were dramatically increased.

It can be considered that the reason why the operation frequency 700 Hz was a border of the results of this experiment does not result from the larger diameter part at the tip end of the electrode rod 21 only. Then, when the inventor observed the state of deformation of the tip end of the electrode during arc discharge in detail, the tip end parts of the electrodes of test lamps in which the arc jumping phenomenon had occurred within 500 hrs were relatively deformed and worn, and they did not have original hemisphere shapes. On the other hand, when observing the test lamps which were lit up at the operation frequencies in the range of 50 to 700 Hz and in which the arc jumping phenomenon had not occurred until 3,000 hrs, deformation and wearing of the tip of the hemisphere-shaped electrodes was slight and protruding parts were formed on the extension of the electrode axis (i.e., in the vicinity of the center portion of the hemisphere).

Figure 10:
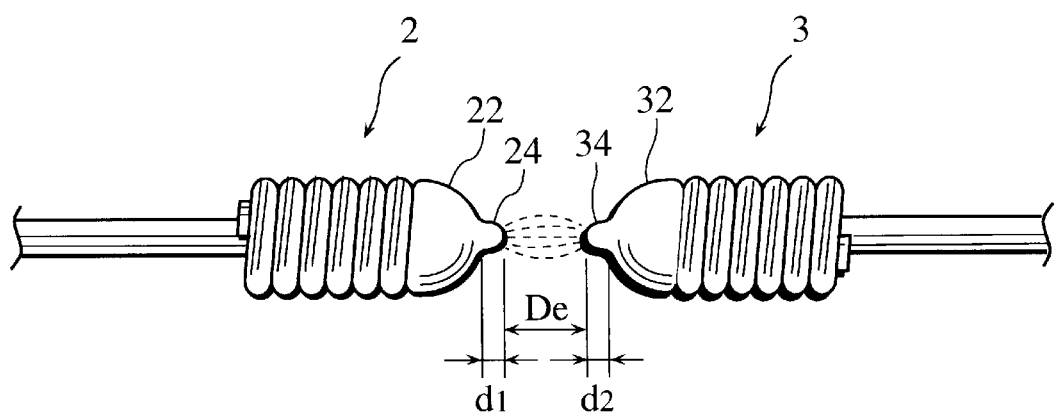
FIG. 10 shows a state of the arc discharge occurred between electrodes in the above extra-high pressure mercury lamp.

FIG. 10 shows the shapes of the electrodes 2 and 3 in this case. Protrudent parts 24 and 34 were formed in the vicinity of center portions of the hemispheres of the heads 22 and 32 (i.e., the closest portions to the opposite electrodes), so that the arc was stably produced between both protruding parts 24 and 34 and the arc jumping phenomenon became hard to occur.

From these observations, it became evident that the head of a larger diameter and having a convexly curved surface toward the opposite electrode, which is formed at the tip end of the electrode, and the protruding part which is formed in the vicinity of the center portion of the tip end were the essential construction for securely preventing the arc jumping phenomenon in the short arc discharge lamps.

Moreover, examining the procedures where the protruding parts were formed in the above lighting experiment, it was confirmed that the protruding parts were formed within 10 hrs, that is, at an early stage of the lighting hours (2 to 3 hrs on average). It can be considered that such a phenomenon results from the deposition of tungsten especially in the vicinity of the center portion of the electrode tip whose temperature is the highest in the electrode, which evaporated from the electrode and returned to there due to a halogen cycle function realized by filling Br.

In general, the degree of this halogen cycle is strongly influenced by the temperatures of the head and the bulb wall and the amount of the halogen material. When the head 22 having a larger diameter is formed, the heat capacity of the part is increased, so that the rise in the temperature can be prevented as compared to the electrodes for long arc lamps. Therefore, it can be thought that tungsten is concentrated and deposited on the high-temperature tip end portions where the arc discharge is produced, whereby the protrudent portions are formed.

Another feature of the protruding part is that the shape of the protruding part 24 formed at the early stage of the lighting hours does not change until 3,000 hrs after that. This is because deposition of tungsten on the protruding part 24 due to the halogen cycle function and evaporation of tungsten due to the temperature are balanced when the protruding part becomes a predetermined size (In this example experiment, the height of the protruding part is approximately 0.05 mm on average). This protruding part enables the discharge arc to be fixed to the vicinity of the center portion of the electrode tip over lighting times of 3,000 hrs, whereby the arc jumping phenomenon can be prevented.

Meanwhile, the reason why the arc jumping phenomenon prominently occurs at the frequencies of the symmetric square wave more than 700 Hz can be considered as follows. That is, the distance between electrodes De is short (0.5 to 2.0 mm), which is the object of the invention, and the mercury vapor pressure in the arc tube is in high range of 15 MPa to 35 MPa in the extra-high pressure mercury lamp. In such a lamp, an acoustic resonance phenomenon is easy to occur even in the low operation frequency range from 700 Hz to 1,000 Hz exclusive. It can be considered that this phenomenon basically causes the instability of the discharge arc, accelerates the deformation and wearing of the tip of the electrode, and finally triggers the arc jumping phenomenon.

From the above-mentioned considerations, it became evident that the protruding part for stabilizing the discharge arc should be provided in the vicinity of the center portion of the tip end of the electrode, which is processed so as to having a convexly curved surface, in order to almost securely prevent the arc jumping phenomenon, which occurs with the passage of the lighting time in the short arc extra-high pressure mercury lamp.

Experiment 3

Thirdly, the inventor prepared test lamps whose amount of Br in the arc tube 1 was varied in the range of $1 \times 10^{-10}$ to $1 \times 10^{-4}$ mol/cm$^3$ in order to clarify a correlation between the phenomenon in which the protruding part 24 is formed in the vicinity of the center portion of the head 22 and the amount of Br performing the halogen cycle function. Then, the inventor examined the phenomenon in which the protruding part 24 was formed during aging in a square wave operation at the operation frequency of 150 Hz.

In this experiment, the design of the lamp and the arc tube was the same as in Experiment 2 except the amount of Br. Through this experiment, the following facts were found. That is, if the amount of Br filled in the arc tube 1 was in the range of $1 \times 10^{-9}$ to $1 \times 10^{-5}$ mol/cm$^3$, the protruding part 24 having the shape so that the discharge arc can be converged was formed in the vicinity of the center portion of the head 22 within 10 hours after the lamp was lit up. In addition, it was confirmed that, with theses lamps, the arc jumping phenomenon could be almost securely prevented until 3,000 hours after the lamps were lit up.

While, if the amount of Br was less than the above-stated range, the protruding part 24 for converging the discharge arc 24 was not formed, because the halogen cycle did not function well. On the other hand, if the amount of Br was more than the above-stated range, the protruding part 24 itself was formed, but the halogen cycle excessively functioned and a relatively large needle-shape protrudent portion 24 was formed. Consequently, the head 22 was deformed and did not have a convexly curved surface in a hemisphere shape, so that wearing of the tip of the electrode was considerably increased.

As stated above, by specifying the amount of Br in the above range, the protruding part 24 which has a great effect for preventing the arc jumping phenomenon can be easily formed at the early stage of the lighting time.

Experiment 4

For the fourth examination, the inventor prepared electrodes, in each of which a protruding part had been formed in advance in the vicinity of the center portion of the tip end of the electrode processed so as to have a convexly curved surface in a hemisphere shape, in order to support the effect of the protruding part 24 for preventing the arc jumping phenomenon. Then, the inventor examined the occurrence of the arc jumping phenomenon in the lamps having these electrodes during aging in a square wave operation at the operation frequency of 150 Hz.

In this experiment, the electrodes 2 and 3 were produced by the processes in which (i) electrodes subjected to the melt process so that the end portions have convexly curved surfaces, which were the same as in the Experiment 2, were prepared, (ii) a small piece made of tungsten wire ($\phi$0.15 mm×0.7 mm) was melted and welded onto the vicinity of the center portion of the head 22 having the convexly curved surface, using the above-mentioned argon plasma welding apparatus, whereby the same portion as the above-mentioned protruding part 24 was formed.

The amount of Br filled in the arc tube 1 was set at $0.4 \times 10^{-9}$ mol/cm$^3$ within the range where the protruding part 24 was not formed at the early stage of the lighting time. Here, the design of the lamp and the arc tube used in this experiment is the same as in Experiment 2, except the electrode and the amount of Br filled in the lamp. Through the result of this examination also, it was confirmed that the discharge arc was stably converged into the vicinity of the center portion of the tip end of the head 22 when the lamps were lit up in the steady state, and the arc jumping phenomenon could be almost securely prevented until 3,000 hours after the lamps were lit up.

As stated above, it became evident that the discharge arc can be stably converged into the vicinity of the center portion of the tip end of the electrode which was processed so as to having the convexly curved surface in the hemisphere shape by forming the protruding part at the portion, whereby the arc jumping phenomenon can be securely prevented. It was also found that the protruding parts can be easily formed by specifying the amount of Br filled in the arc tube in the specific range, and by lighting up the lamps in a short period of time.

Experiment 5

Finally, the inventor examined problems which would occur when the above method for forming the protruding part 24 by lighting up the lamp in a short period time was applied to the actual lamps.

Forming the protruding part using the halogen cycle, a lamp voltage decreased by relatively large amount with decreases in the distance between electrodes De. When the lamp voltage was less than the designated lamp voltage, an optical output power, i.e., a luminance on the display screen was decreased, because a lamp input power was decreased.

FIG. 11 shows a result of the experiment, which indicates a variation $\Delta V1a$ developed due to the formation of the protruding part at the tip end of the electrode.

This figure shows a result of measuring the variation in the lamp voltage $\Delta V1a$ after 10 hours has elapsed since the lamp was lit up. As shown in this figure, the lamp voltages were decreased by 6.2V on average in the test lamps which were lit up at the lighting frequencies of 50 to 700 Hz so that the protruding parts 24 were formed in the vicinity of the tip of the heads 22. On the other hand, the lamp voltage was increased by 5.7V in the test lamps which were lit up at frequencies more than 700 Hz so that no protruding parts were formed there.

The reason why the lamp voltage was decreased by a relatively large amount due to the formation of the small protruding part can be considered as follows. That is, in case of the short arc type lamp whose distance between electrodes de is 2.0 mm or less, even when a small variation occurs in the height of the protruding part, a variation ratio to the distance between electrodes De(Δde/De) becomes relatively large.

As stated above, although the arc jumping phenomenon, which is specific to the short arc type lamp can be prevented, it is difficult to make the high-pressure discharge lamp of the invention practicable unless the problem of decrease in the lamp voltage is solved.

Then, in order to solve the problem of decrease in the lamp voltage as above, the distance between electrodes was increased in advance by a distance corresponding to the growth of the protruding part (d1+d2 in FIG. 10).

From FIG. 11, an average electric potential gradient E1$a$ of the discharge arcs in the test lamps is 56V/mm (=(average initial lamp voltage V1$a$)/(distance between electrodes De)= 61.6V/1.1 mm). Therefore, the average variation in the lamp voltage (decrease) ΔV1$a$=−6.2V corresponds to approximately 0.1 mm of a variation Δde in the distance between electrodes De.

Then, the inventor prepared the test lamps whose distance between electrodes De$_0$ was 1.2 mm, in consideration of the average variation in the lamp voltage (decrease) ΔV1$a$ (=−6.2V) after the initial lighting, i.e., the variation in the distance between electrodes Δde (≈0.1 mm), and examined the formation of the protruding parts and the variation in the lamp voltage ΔV1$a$ after 10-hour aging.

Note that the design of the arc tubes in the following test lamps is the same as in the above Experiment 2, unless otherwise specified, and the operation frequency is 150 Hz.

As shown in FIG. 12, the protruding parts were observed after 10-hour aging, the average variation in the lamp voltage ΔV1$a$ was −6.2V, and the average lamp voltage V1$a$ after aging was close to the rated value 61V of the lamp. As stated above, the shapes of the protruding parts 24 have not much changed after that until 3,000 hours, so that the lamp voltages have been relatively stable and the arc jumping phenomenon was able to be almost securely prevented.

In this way, a desired optical output power can be obtained by correcting the distance between electrodes De in advance by the variation Δde resulting from the formation of the protruding parts by initial lighting.

Experiment 6

Next, the inventor examined methods for adjusting the distance between electrodes De by varying the lighting conditions, and invented the following two methods. The first method is to force the discharge arc current to be decreased and increased, and the second method is to change the operation frequency. The following describes these methods in detail.

(1) Decrease and Increase in the Discharge Arc Current

It can be considered that, if the discharge arc current is increased more than the predetermined value, then the temperature in the vicinity of the center portion of the electrodes is increased, and evaporation of tungsten from there becomes active as compared to deposition of tungsten due to the halogen cycle function, so that the size of the protruding parts will be reduced.

In view of the above considerations, the inventor conducted an experiment where the lamp voltage was measured by increasing the discharge arc currents from 2.45A to 2.72A on average. FIG. 13 shows the result of the experiment.

As shown in FIG. 13, although the initial lamp voltage was 61.2V on average, it was decreased by 6.1V on average after 10 hours since the lamps were lit up. However, when the discharge arc current was increased, the lamp voltage was increased to a variation of −3.8V on average in comparison to the initial lamp voltage. In response to changes in the voltage, it was confirmed that the size of the protruding parts was reduced.

By this experiment, it was shown that, in case of decrease in the lamp voltage, the length of the protruding part was able to be reduced by increasing the discharge arc current, whereby the lamp voltage was able to be restored. On the other hand, in case of increase in the lamp voltage to be more than the rated value, it can be considered that a length of the protruding part becomes too short. Therefore, if the length is restored by decreasing the discharge arc current by a predetermined value, the lamp can always be lit up at the optimum lamp voltage.

As a result of a confirmation experiment according to this lighting method, it was confirmed that the lamp voltages of the test lamps have been stable throughout the lighting time of 3,000 hours, and the arc jumping phenomenon was able to be prevented. Thereby, it was shown that an optical output power without fluctuation and decrease in the luminance on the display screen, but with a long life and a high quality can be obtained by the lighting method of the invention.

Figure 14:
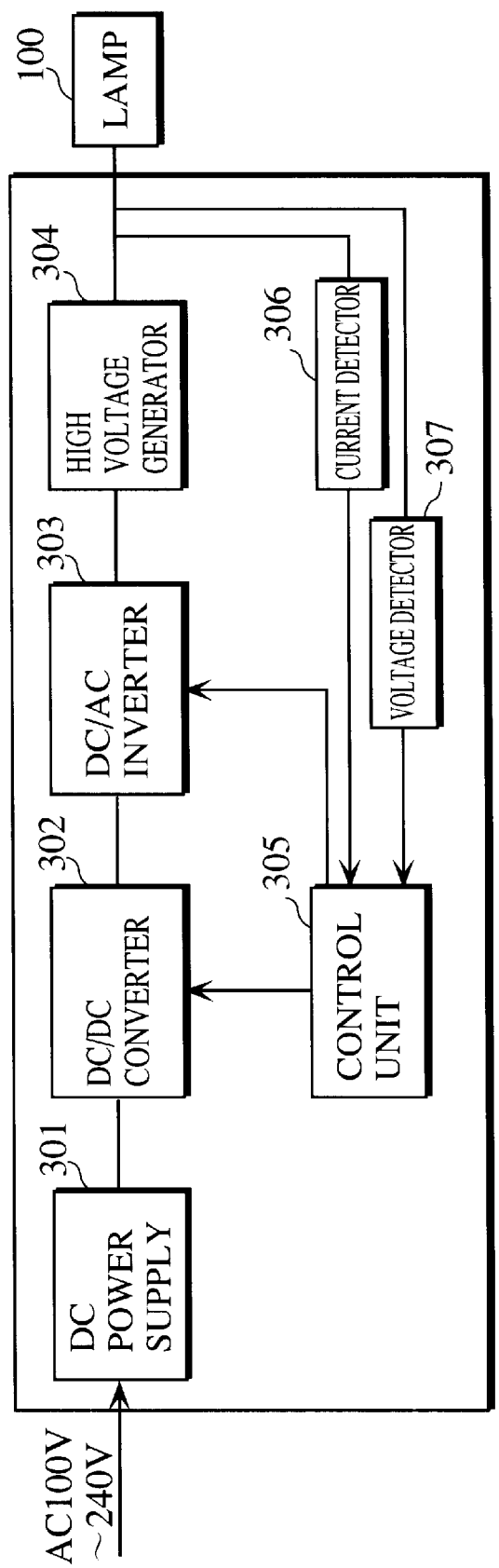
FIG. 14 is a block diagram showing a configuration of a lighting device of the above extra-high pressure mercury lamp.

FIG. 14 is a block diagram showing the construction of a lighting apparatus (ballast) 300 for executing the above lighting method. As shown in this figure, this lighting apparatus 300 is made up of a DC power supply 301, a DC/DC converter 302, a DC/AC inverter 303, a high voltage generator 304, a control unit 305, a current detector 306, and a voltage detector 307.

The DC power supply 301 converts AC 100V to 240V for home use into a DC voltage, and the DC/DC converter 302 supplies a predetermined DC current controlled by the control unit 305 to the DC/AC inverter 303. The DC/AC inverter 303 generates an AC square wave current at a predetermined frequency according to directions from the control unit 305 and transmits the same to the high voltage generator 304. The high voltage generated at the high voltage generator 304 is applied to the extra-high pressure mercury lamp 100.

Meanwhile, detected signals obtained from the current detector 306 which detects the discharge arc current from the extra-high pressure mercury lamp 100 and the voltage detector 307 which detects the lamp voltage across the same lamp 100 are input to the control unit 305. The control unit 305 lets the DC/DC converter 302 generate a predetermined current by controlling the same on the basis of these input signals.

More specifically, the control unit 305 stores a reference voltage and a control program in its internal memory. In comparison between the detected lamp voltage and the reference voltage, if the former is lower than the latter, the control unit 305 lets the DC/DC converter 302 feed a higher discharge arc current A1 by performing a feed-back control. While, if the former is higher than the latter, the control unit 305 lets the DC/DC converter 302 feed a discharge arc current A2 higher than A1 by performing a feed-back control. The rated lamp voltage is designated as the reference voltage, and specific values of A1 and A2 can be predetermined through experiments for each lamp type.

Here, if a change in the discharge arc current is carried out only after a lamp voltage variation ΔV1$a$ becomes more than a predetermined value, the variation is obtained from the detected lamp voltage, the frequency of the current switching control can be reduced.

(2) Change in the Operation Frequency

Next, the inventor paid attention to the fact that the protruding parts were not formed when the operation frequency of the symmetric square wave was more than 700 Hz. Then, the inventor performed an experiment in which the test lamps having the protruding parts 24 after the initial lighting at the frequency of 150 Hz had been lit up for 10 hours at the frequency of 800 Hz, and examined changes in their shape of the protruding parts 24 and changes in the lamp voltage variation $\Delta V1a$. FIG. 15 shows the result of this experiment.

As shown in this figure, when the test lamps having the protruding parts had been lit up for 10 hours at the frequency of 150 Hz, the lamp voltage decreased by 6.0V on average from the initial state. While, when the same test lamps had been lit up for 10 hours at the frequency of 800 Hz, it was observed that the protruding parts had practically disappeared, which was different from the case where the size of the protruding parts were reduced in the above (1). Corresponding to this state, the lamp voltage variation $\Delta V1a$ has decreased and the lamp voltage returned to the original value before the initial lighting.

It can be considered that the disappearance of these protruding parts results from increase in evaporation of tungsten due to increase in the temperature of the tip of the head 22. In addition, the inventor confirmed that, when the test lamps whose protruding parts had disappeared had been lit up for 10 hours at the frequency of 150 Hz again, the protruding parts were formed again and the lamp voltage V1a also decreased again.

As stated above, focusing attention to the phenomenon where formation and disappearance of the protruding parts 24 can be repeated by changing the operation frequency, the inventor conducted the following experiment. That is, with the lighting apparatus having a feed-back control circuit by which (i) fluctuations $=\Delta V1a$ from the initial lamp voltage during the aging are detected, and (ii) the square wave frequency is switched from 150 Hz to 800 Hz every time the value of $\Delta V1a$ is equal to $-2V$, the inventor observed changes in the shapes of the heads in the test lamps during aging and the generation state of the arc jumping phenomenon.

As a result, it was found that deformation and wearing of the tip of the electrode was relatively slight, and the arc jumping phenomenon rarely occurred. Moreover, fluctuations in the lamp input power, (i.e., fluctuations in the luminance of the display screen) was decreased to approximately to one third the original one, which does not matter for practical use.

In this way, to control the lamp voltage variation $\Delta V1a$ so as to be in a relatively small range during aging by changing the operation frequency of the symmetric square wave of the ballast may be one of the methods to solve the problems.

Note that a pair of switched frequencies is not limited to this one (i.e., 150 Hz and 800 Hz), and the other appropriate frequency may be selected among any frequencies from 50 Hz to 700 Hz inclusive to grow the protruding part 24. On the contrary, in order to diminish the protruding part, the other appropriate frequency can be selected among any frequencies either less than 50 Hz or 750 Hz or more.

Here, it was observed that, although the protruding part diminished at the frequencies of less than 50 Hz and 750 Hz or more, the diminishing can be more rapidly performed at the frequencies less than 50 Hz than 750 Hz or more. The reason can be considered as follows. That is, if the frequency is less than 50 Hz, a time period until the polarity is reversed (a half period) will be increased correspondingly. Since this is close to the state where a DC current is applied between electrodes, the tip of the electrode reaches a higher temperature than the case at the higher frequency, and the material becomes easy to evaporate.

In summary, if diminishing of the protruding parts is desired, a frequency of less than 50 Hz or 750 Hz or more may be selected. In this case, in terms of the speed of diminishing, it is preferable to select a frequency of less than 50 Hz.

The lighting apparatus for executing the above-stated lighting method has the same construction as the lighting apparatus 300 shown in FIG. 14. However, the control content of the control unit 305 is different. That is, in this apparatus, the control unit 305 gets the lamp voltage variation $\Delta V1a$ according to the lamp voltage detected by the voltage detector 307. If the variation becomes more than the predetermined value, then the control unit 305 selects a frequency according to the polarity of the variation so that the protruding part becomes a normal size, and gives a direction to the DC/AC inverter 303 so as to generate a square wave at the operation frequency.

From the above results and considerations through the experiments 5 and 6, it became evident that the problem that the lamp input power decreases with decreases in the lamp voltage, coming with the formation of the protruding parts 24 at the head 22 in order to prevent the arc jumping phenomenon can be solved by the following three means: (a) correction of the distance between electrodes De in advance, (b) correction of the distance between electrodes De by the discharge arc current, and (c) correction of the distance between electrodes De by the frequency of the square wave.

As described above, the invention enables the discharge arc to converge at the vicinity of the tips of the electrode by forming the protruding part in the vicinity of the center portion of the tips of the electrodes, so that the arc jumping phenomenon due to aging can be securely prevented. In addition, the invention solves the problems of decrease in the lamp input power coming with the formation of the prudent part using the effective means shown in the above (a) to (c). Therefore the extra-high pressure mercury lamp having a short arc construction, while having a high quality, i.e., being free from fluctuations and decrease in the luminance on the display screen, can be realized.

Manufacturing Method

Finally, a method for manufacturing the above extra-high pressure mercury lamp 100 will be briefly described. This method can be roughly divided into the following three steps.

(1) Step for Forming a Head

As described with reference to FIGS. 7A and 7B, a two-layered wound tungsten coil 23 is attached to the tip of the electrode rod 21 made of tungsten (FIG. 7A), then the tip is melted using the argon plasma welding apparatus (See FIG. 8) to form a substantially hemisphere-shaped head 22 (FIG. 7B).

(2) Step for Sealing Electrodes

A piece of molybdenum foil and an outer molybdenum lead wire are connected to either end of a pair of electrodes formed as in FIG. 7B and the arc tube 1 is sealed at both ends so that the electrodes face each other with an interval longer than De by $\Delta$de between them in order to obtain a rated output power.

In this case, air within the vessel is extracted, while the previously mentioned amount of mercury and a halogen material are filled. Here, the value of $\Delta$de is substantially equal to the sum of heights of protruding parts formed at the both electrodes in the next step for forming the protruding parts, and this can be obtained in advance through experiments.

(3) Step for Forming Protruding Parts

The protruding part 24 is formed at the tip of the head 22 by lighting up the extra-high pressure mercury lamp 100 whose electrodes were sealed using a square wave current for a predetermined time period. This predetermined time is preferably a required time for the protruding part 24 to grow to a predetermined height and to become stable in the height due to the halogen cycle function. Thus, this time varies to some extent according to various conditions. In a preferable embodiment of the invention, this is set at approximately 3 hours.

In this step, a frequency of the AC square wave lighting is set at an appropriate frequency in the range of 50 Hz to 700 Hz. Thereby, the protruding part is formed in the vicinity of the center portion of the hemisphere-shaped head as above.

According to the above steps, the extra-high pressure mercury lamp 100 having the electrodes shown in FIG. 5 can be fabricated.

Modifications

Naturally, the invention is not limited to the above embodiments, and the following modifications are applicable.

(1) In the Above Embodiments, the tip of the electrode rod is a substantially hemisphere-shape. However, it can be considered that the protruding part is formed at a portion where the arc discharge is easy to occur, that is, the closest portion to the opposite electrode. Therefore, even if the surface facing the opposite electrode has a convexly curved surface, other than the hemisphere shape, the protruding part can be stably formed at the top of the convexly curved surface or in the vicinity thereof.

In addition, if adopting a method in which a small piece of tungsten is attached to the tip of the electrode by means of welding or the like, not the halogen cycle function during the initial lighting, there is no need to consider the portion where the protruding part is easy to be formed during the initial lighting. Therefore, as far as the heat capacity of the tip of the head is larger than that of the electrode rod, there is no need to limit the shape to the convexly curved surface.

In case that the shape of the tip of the head is not limited to the convexly curved surface as above, in general, as far as the electrode is configured so that a volume of the head per length in the axis direction is larger than that of the electrode rod, the heat capacity of the tip of the head (strictly speaking, the heat capacity per length in the axis direction) can be larger than that of the electrode rod.

(2) In the above embodiments, Br is selected as the halogen material for performing the halogen cycle function. However, the other appropriate halogen material may be used.

(3) In the above embodiments, when the protruding parts 24 are formed in the vicinity of the center portion of the hemisphere-shaped head 22, a square wave current at an appropriate frequency among 50 to 700 Hz are applied there. However, this is not limited to the square wave but may be an AC sine wave.

(4) The above embodiments show examples of the extra-high pressure mercury lamp in which the distance between electrodes De is in the range of 0.5 mm to 2.0 mm, and the mercury vapor pressure is in the range of 15 MPa to 35 MPa when the lamp lights up in the steady state. Naturally, the invention can apply to the other high-pressure discharge lamps which have the problem of the arc jumping phenomenon.

(5) Finally, the above embodiments deal with AC discharge lamps. However, the effects obtained from the above shape of the electrode against the arc jumping phenomenon must be theoretically realized in DC discharge lamps as well. In this case, at least an electrode as an anode may have the head whose tip has a convexly curved surface on which the protruding part is formed as above.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A high pressure discharge lamp comprising:

an arc tube enclosing a hermetically sealed arc chamber that contains a light-emitting substance;

a first electrode rod and a second electrode rod spaced apart from each other, each extending into the arc chamber, at least one of the first and second electrode rods having a head integrally coupled with the electrode rod in the arc chamber with a protruding part formed on the head at a portion opposite the other electrode rod, the head having a larger volume per unit length in the direction of the axis of the electrode rod than the electrode rod; and a halogen substance filling the arc chamber in a range of $1 \times 10^{-9}$ mol/cm$^3$ to $1 \times 10^{-5}$ mol/cm$^3$, inclusive.

2. The high pressure discharge lamp of claim 1, wherein a surface of the head being opposite to the other electrode rod is convex; and the protruding part is on the surface of the head nearest to the other electrode rod.

3. The high pressure discharge lamp of claim 1, wherein the light-emitting substance includes mercury, a distance between the first and second electrodes is in a range of 0.5 mm to 2.0 mm inclusive, and mercury vapor pressure within the arc chamber is in a range of 15 MPa to 35 MPa inclusive, when the lamp is lit and in a steady state.

4. The high pressure discharge lamp of claim 1, wherein the halogen substance is bromine.

5. A method for manufacturing a high pressure discharge lamp in which a first and a second electrodes are provided so that tip ends of the electrodes face each other in an arc tube comprising the steps of:

a head formation step for forming a head at an end of an electrode rod of at least one of the first and the second electrodes, wherein the head has a larger volume per unit length in the direction of the axis of the electrode rod than the electrode rod;

a sealing step for sealing the first and the second electrodes so that the tip ends of the electrodes face each other at a predetermined interval; and a protruding part formation step for forming a protruding part on the head at a portion opposite to the tip end of the other electrode.

6. The method for manufacturing the high pressure discharge lamp of claim 5, wherein, in the sealing step, in case that a specified distance between the first and the second electrodes is De, the first and the second electrodes are sealed in the arc tube so that the tip ends face each other at the interval equal to the sum of the De and $\Delta$de.

7. The method for manufacturing the high pressure discharge lamp of claim 6,
   wherein, in the protruding part formation step, the protruding part is formed by applying an AC current between the first and the second electrodes for a predetermined period of time.

8. The method for manufacturing the high pressure discharge lamp of claim 7,
   wherein a value of the $\Delta de$ is almost equal to a length of decrease in the distance between the first and second electrodes resulting from the formation of the protruding parts in the protrudent formation step.

9. The method for manufacturing the high pressure discharge lamp of claim 5,
   wherein, in the protruding part formation step, the protruding part is formed by applying an AC current between the first and the second electrodes for a predetermined period of time.

10. The method for manufacturing the high pressure discharge lamp of claim 9,
    wherein a frequency of the applied AC current is in a range of 50 Hz to 700 Hz inclusive.

11. The method for manufacturing the high pressure discharge lamp of claim 5,
    wherein the sealing step further comprising the step of:
    filling the arc tube with mercury so that a mercury vapor pressure is in a range of 15 MPa to 35 MPa inclusive when the lamp is lit up in the steady state.

12. The method for manufacturing the high pressure discharge lamp of claim 5,
    wherein the sealing step further comprising the step of:
    filling the arc tube with a halogen material in a range of $1 \times 10^{-9}$ mol/cm$^3$ to $1 \times 10^{-5}$ mol/cm$^3$ inclusive.

13. The method for manufacturing the high pressure discharge lamp of claim 5,
    wherein the head formation step comprising the steps of:
    covering the end of the electrode rod with coil; and
    melting the end of the electrode rod and the coil, while keeping the electrode rod with the end being downward and the axis being approximately in the vertical direction.

14. A lighting method for a high pressure discharge lamp having a pair of electrode rods with heads, the electrode rods placed in an arc tube with the heads facing each other in the arc tube, each head having a protruding part formed at the end of the head, the steps of the method comprising:
    forcing an increase in the discharge arc current applied between the electrode rods, when a monitored voltage between the electrode rods becomes less than a predetermined voltage in order to decrease the length of the protruding parts on the heads of the electrode rods; and
    forcing a decrease in the discharge arc current applied between the electrode rods, when the monitored voltage becomes equal to or greater than the predetermined voltage in order to increase the length of the protruding parts on the heads of the electrode rods.

15. A lighting method for a high pressure discharge lamp in which a pair of electrodes that each have a head at an end of an electrode rod and a protruding part formed at an end of the head are provided so that the heads of the electrodes face each other in an arc tube, wherein each head is thicker than the electrode rod, comprising the steps of:
    a first step for setting a frequency of an AC current applied between the electrodes at a first frequency when a monitor voltage between the electrodes rises to a first voltage; and
    a second step for setting a frequency of the AC current at a second frequency, when the monitor voltage drops to a second voltage, the second voltage is lower than the first voltage.

16. The lighting method for the high pressure discharge lamp of claim 15,
    wherein the first frequency is less than 50 Hz, and
    the second frequency is in a range of 50 Hz to 700 Hz inclusive.

17. The lighting method for the high pressure discharge lamp of claim 15,
    wherein the first frequency is 750 Hz or more, and the second frequency is in a range of 50 Hz to 700 Hz inclusive.

18. A lighting device for a high pressure discharge lamp having a pair of electrode rods, each electrode rod have a head at an end of the electrode rod with a protruding part formed on the head, the electrode rods placed in an arc tube so that the heads of the electrode rods face each other in the arc tube, each head being thicker than the electrode rod, the lighting device comprising:
    a current generation means for generating a current which is applied between the heads of the pair of electrode rods;
    a voltage detection means for detecting a voltage developed across the heads of the pair of electrode rods; and
    a control means for controlling the current generation means to adjust the current between the heads of the pair of electrode rods to increase when the detected voltage is less than a predetermined voltage, and to decrease when the detected voltage is equal to or greater than a predetermined voltage.

19. A lighting device for a high pressure discharge lamp in which a pair of electrodes that each have a head at an end of an electrode rod and a protruding part formed at an end of the head are provided so that the heads of the electrodes face each other in an arc tube, wherein each head is thicker than the electrode rod, comprising:
    a current generation means for generating an AC current which is applied between the pair of electrodes;
    a voltage detection means for detecting a voltage developed across the pair of electrodes; and
    a control means for controlling the current generation means and allowing the current generation means to adjust a frequency of the AC current between the pair of electrodes according to a detected result by the voltage detection means.

20. A lighting method for a high pressure discharge lamp in which a pair of electrode rods, each having a head at an end of the electrode rod and a protruding part formed on the head, are placed in an arc tube so that the heads of the electrode rods face each other in the arc tube, the lighting method comprising the steps of:
    a first step of forcing an increase to discharge arc current applied between the electrode heads whenever the distance between the electrode heads becomes less than a normal value due to an increase in length of the protruding parts; and
    a second step of forcing a decrease to the discharge arc current whenever the distance between the electrode heads becomes greater than the normal value due to the protruding parts decreasing in length.

21. A lighting method for a high pressure discharge lamp in which a pair of electrode rods, each having a head at an end of the electrode rod and a protruding part formed on the head, are placed in an arc tuber so that the heads of the electrode rods face each other in the arc tube, the lighting method comprising the steps of:

a first step of setting a frequency of an AC current applied between the electrode heads at a first frequency whenever the distance between the electrode heads becomes less than a normal value due to an increase in length of the protruding parts; and a second step of setting a frequency of the AC current at a second frequency whenever the distance between the electrode heads becomes greater than the normal value due to the protruding parts decreasing in length.

* * * * *